(12) United States Patent
Twerdochlib

(10) Patent No.: US 8,192,077 B2
(45) Date of Patent: *Jun. 5, 2012

(54) METHOD OF MEASURING IN SITU DIFFERENTIAL EMISSIVITY AND TEMPERATURE

(75) Inventor: Michael Twerdochlib, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 157 days.

This patent is subject to a terminal disclaimer.

(21) Appl. No.: 12/574,096

(22) Filed: Oct. 6, 2009

(65) Prior Publication Data

US 2010/0014555 A1 Jan. 21, 2010

Related U.S. Application Data

(63) Continuation of application No. 11/217,884, filed on Sep. 1, 2005, now Pat. No. 7,632,012.

(51) Int. Cl.
*G01J 5/02* (2006.01)
(52) U.S. Cl. ...... 374/129; 374/121; 374/141; 250/338.1
(58) Field of Classification Search ............... 374/2, 120, 374/121, 126, 129, 29, 137, 166, 167, 141, 374/8; 250/338.1, 339.06, 339.09, 339.11, 250/338.3, 504 R, 227.18, 495.1, 339.02, 250/339.03, 341.1–341.8, 252.2, 493.1, 559.41–559.46, 250/339.04, 342; 356/43
See application file for complete search history.

(56) References Cited

U.S. PATENT DOCUMENTS

| | | | |
|---|---|---|---|
| 2,971,093 A * | 2/1961 | Garbuny | 250/333 |
| 3,278,746 A * | 10/1966 | Fiat | 250/253 |
| 3,539,807 A | 11/1970 | Bickel | |
| 3,619,059 A | 11/1971 | Muller | |
| 4,579,461 A | 4/1986 | Rudolph | |
| 4,591,996 A | 5/1986 | Vachon | |
| 4,611,930 A | 9/1986 | Stein | |
| 4,634,291 A | 1/1987 | Bantel et al. | |
| 4,659,234 A | 4/1987 | Brouwer et al. | |
| 4,708,493 A | 11/1987 | Stein | |
| 5,314,249 A * | 5/1994 | Marui et al. | 374/128 |
| 5,507,576 A | 4/1996 | Fally | |
| 5,721,615 A | 2/1998 | McBride et al. | |
| 5,868,496 A | 2/1999 | Spitzberg | |
| 5,876,860 A | 3/1999 | Marijnissen et al. | |
| 5,957,581 A | 9/1999 | Katzir et al. | |
| 5,997,175 A | 12/1999 | Champetier et al. | |
| 5,998,003 A | 12/1999 | Courtright et al. | |
| 6,015,630 A | 1/2000 | Padture et al. | |
| 6,072,150 A | 6/2000 | Sheffer | |
| 6,072,568 A | 6/2000 | Paton et al. | |

(Continued)

FOREIGN PATENT DOCUMENTS

JP 03118428 A * 5/1991

(Continued)

*Primary Examiner* — Gail Verbitsky (57) ABSTRACT

A method for measuring the differential emissivity between two sites on the surface of a body and the temperature of the two sites. The method includes a plurality of measurements of the infrared radiation arising from each of the two sites under a number of different conditions. Some of the measurements include irradiation by external infrared radiation at a known wavelength and intensity. The infrared radiation arising from each of the sites may include emitted radiation, reflected ambient radiation, and reflected external radiation. Additionally, the temperature determined using the method described can be used to calibrate infrared imaging devices used to inspect the entire body.

7 Claims, 1 Drawing Sheet

U.S. PATENT DOCUMENTS

| | | |
|---|---|---|
| 6,265,696 B1 | 7/2001 | Sakurai et al. |
| 6,364,524 B1 | 4/2002 | Markham |
| 6,394,646 B1 | 5/2002 | Ringermacher et al. |
| 6,434,267 B1 | 8/2002 | Smith |
| 6,461,035 B2 | 10/2002 | Meinlschmidt et al. |
| 6,482,148 B1 | 11/2002 | Luke |
| 6,853,951 B2 | 2/2005 | Jarrell et al. |
| 6,874,932 B2 | 4/2005 | Devitt et al. |
| 6,875,464 B2 | 4/2005 | Ruud et al. |
| 6,963,816 B1 | 11/2005 | Poulsen |
| 7,009,695 B2 | 3/2006 | Some |
| 7,239,974 B2 * | 7/2007 | Gulati ............ 702/131 |
| 7,265,366 B2 | 9/2007 | Van Der Pasch et al. |
| 7,422,365 B2 | 9/2008 | Chamberlain et al. |
| 2002/0011852 A1 | 1/2002 | Mandelis et al. |
| 2003/0087120 A1 | 5/2003 | Torigoe et al. |
| 2003/0117619 A1 | 6/2003 | Vo-Dinh et al. |
| 2003/0118874 A1 | 6/2003 | Murphy |
| 2003/0140855 A1 | 7/2003 | Rigney et al. |
| 2003/0140856 A1 | 7/2003 | Corderman et al. |
| 2003/0180571 A1 | 9/2003 | Singh |
| 2003/0197126 A1 | 10/2003 | Sato et al. |
| 2003/0207155 A1 | 11/2003 | Morrison et al. |
| 2004/0038086 A1 | 2/2004 | Litton et al. |
| 2004/0073673 A1 | 4/2004 | Santos et al. |
| 2004/0096314 A1 | 5/2004 | Kool et al. |
| 2004/0179575 A1 | 9/2004 | Markham |
| 2005/0061058 A1 | 3/2005 | Willsch et al. |

FOREIGN PATENT DOCUMENTS

| | | |
|---|---|---|
| JP | 2003074376 | 3/2003 |

* cited by examiner

METHOD OF MEASURING IN SITU DIFFERENTIAL EMISSIVITY AND TEMPERATURE

CROSS-REFERENCE TO RELATED APPLICATION

This application is a continuation of U.S. patent application Ser. No. 11/217,884 filed on Sep. 1, 2005 now U.S. Pat. No. 7,632,012.

FIELD OF THE INVENTION

The present invention is directed generally to methods for on-line monitoring of components and, in particular, making measurements of temperature and differential emissivity.

BACKGROUND OF THE INVENTION

Combustion turbines typically operate at extremely high temperatures, for example, 1500° F. to 2000° F. for steam turbines and 2500° F. to 2900° F. for gas turbines. These high temperatures can cause failure of various components unless the components are protected from the heat. The components include the rotating blades of the turbine, and the vanes for directing gas flow within the turbine. A typical combustion turbine will have three to four rows each of blades and vanes, with approximately 50 to 100 blades or vanes per row, and will typically have approximately 500 total blades and vanes to protect. A commonly used material for vanes and blades is a superalloy such as nickel-cobalt. Other turbine components exposed to these high temperatures include the combustor and the transition. All of these high temperature components are generally insulated by a thermal barrier coating (TBC) so that the turbine can be operated at high temperatures without causing excessive deterioration of these components. A typical TBC comprises yttria stabilized zirconia.

Proper maintenance of turbine engines requires periodic inspection of the turbine components for deterioration or spalling of the TBC and other defects, such as cracks in the underlying components. When spalling or deterioration occurs, stress in the immediate area causes the surface to heat up resulting in further deterioration or spalling of the coating and, eventually, weakening of the superalloy body. In order to prevent turbine failure, it is desirable to monitor the condition of these components and replace or repair them when necessary. Since spalling of the TBC and other defects cause the surrounding areas to heat up, one way to monitor the condition of the TBC is to measure the temperature of the TBC on the blades and vanes.

One common method of measuring temperature relies on detecting the infrared radiation emitted by the TBC surface. Determining the temperature of a turbine component using radiation detected from a site on a body located within the turbine is complicated by the fact that emissivity is difficult to determine. Some current techniques for infrared radiation-based temperature measurements assume that the emissivity of the location being measured is equal to one (i.e. the location is a perfect black body emitter). Other approaches estimate emissivity at the site by measuring the emissivity of a sample composed of the same material as is present in the actual site while the sample is heated to approximately operating temperatures under controlled laboratory conditions. Both the black body assumption and the laboratory estimate often result in inaccuracies because emissivity is a function of temperature, surface type, surface age, and other factors.

In laboratory conditions the inaccuracy introduced by the black body assumption or emissivity estimates do not typically affect temperature measurements because the only radiation, if any, impinging on the measured site is (i) from an external source controlled by the tester, (ii) negligible compared to the emitted radiation, or (iii) both. In contrast, a site on a component of a combustion turbine is surrounded by other surfaces that are emitting ambient radiation at intensities similar to that of the measured site. The lower the emissivity (i.e. the higher the reflectivity), the more the radiation impinging on the site is reflected toward the radiation detector. If a significant, unknown amount of ambient radiation is reflected by the measured site, the temperature reading may not be accurate if, as in the black body assumption, the reflected radiation is treated as though it were emitted from the measured site. Similarly, if the emissivity cannot be determined or eliminated from the calculation, an error may be introduced into the temperature measurement. Thus, there is a need for a method of temperature measurement that can provide accurate temperature measurements that account for ambient radiation that is reflected by the measured site and that are based on the emissivity of the actual measured site.

Another source of error introduced by the black body assumption or emissivity estimates stems from the amount of infrared radiation emitted from the site. The amount of emitted radiance due to the site's temperature is directly proportional to the emissivity of the body. Thus, a significant error in the temperature measurement may result if the black body assumption is used and the emissivity deviates significantly from this assumption. Similarly, the emissivity estimates can be incorrect if the age or condition of the actual surface cause it to have an emissivity that is significantly different from the sample material that is tested. Accordingly, there is a need for a method of temperature measurement that can provide accurate temperature measurements that account for the actual emissivity of the site being measured.

One method for monitoring the condition of turbine parts is disclosed in U.S. Pat. No. 6,072,568. The '568 Patent discloses a nondestructive, off-line method of determining residual stress proximate an intermediate layer in a multilayer TBC system by directing a laser beam through an outer ceramic thermal insulating layer to an intermediate layer. The laser causes a species in the intermediate layer to fluoresce. The amount of fluorescence is detected and compared to control samples to determine stress, not temperature. A major disadvantage of this method is that the measurements are made on a single site on the turbine component. A full analysis of a typical turbine using this method could require at least one measurement for each of the approximately 500 blades and vanes. Thus, there is a need for a method of monitoring the condition of the blades that does not require this excessive number of measurements.

Another method of measuring the condition of turbine parts is disclosed in U.S. Patent Application Publication No. 2004/0179575. The '575 Patent Application Publication discloses a device that detects long wavelength infrared radiation and short wavelength infrared radiation to measure the surface temperatures of the TBC and the underlying substrate, respectively. The '575 method measures temperature without using an external IR emitting source and without accounting for ambient radiation that is reflected by the site. Furthermore, the '575 method does not disclose a method for measuring the temperature of a site based on in situ measurements of the site's emissive properties. Instead, the '575 method relies on the relative values of the detected short wavelength and long wavelength infrared radiation to locate defects in the TBC surface. Thus, there is a need for a method of measuring the temperature of the blades and vanes that is based on the measured site's in situ emissive properties.

SUMMARY OF THE INVENTION

The present invention provides a method of measuring the in situ emissive properties of two sites on a body. The sites may, or may not, be in substantial proximity to one another. Another aspect of the present invention is a method of measuring the temperature of a site on a body, where the method relies on the in situ emissive properties of the site being measured. The method of the present invention also measures the temperature of a site on a body in a manner that minimizes errors caused by reflected ambient radiation. Yet another aspect of the present invention is a method of measuring the temperature of a portion of, or all of, a body without the need to conduct an excessive number of measurements.

The method of the present invention uses a plurality of radiation measurements that detect the infrared radiation arising from at least two sites on a body. Some radiation measurements may be made while a site is irradiated by external infrared radiation while other radiation measurements may be made without external infrared radiation. The radiation measurements may then be used to determine one or more of the following: the differential emissivity between the two sites, the temperature of the measured sites, the temperature profile of the entire body, and the temperature profile of adjacent bodies.

One embodiment of the present invention is useful as a method of measuring the in situ differential emissivity between two sites on a body. The method may include the steps of detecting the infrared radiation at a first wavelength arising from a first site on a body and then detecting the infrared radiation at the first wavelength arising from the first site while the first site is irradiated by external infrared radiation at the first wavelength. The method may also include the step of detecting the infrared radiation at the first wavelength arising from a second site on the body and then detecting the infrared radiation at the first wavelength arising from the second site while the second site is irradiated by external infrared radiation at the aforementioned first wavelength. Finally, the in situ differential emissivity may be determined using the intensity values of the infrared radiation arising at said first wavelength from the first site and the second site.

In another embodiment of the present invention, radiation detection may be used to measure the temperature of a site on a body. The method may include the steps of detecting the infrared radiation at a first wavelength arising from a first site on the body. The infrared radiation arising from the first site at the first wavelength may then be detected while the first site is irradiated by external infrared radiation at the first wavelength. The infrared radiation arising from the first site at a second wavelength may then be detected while the first site is irradiated by external infrared radiation at the second wavelength. Another step of the invention may be to repeat the three conditions described immediately above to detect the amount of infrared radiation arising from a second site on the body. Finally, the temperature of the first and second sites may be determined using the infrared radiation intensities detected from the first site and the second site under the aforementioned conditions.

In yet another embodiment of the present invention, the temperature of a site on a body may be determined using a method of the current invention. The temperature of that site may then be used to calibrate an on-line infrared imaging device that is focused on a portion of the body larger than the sites being measured, up to and including the entire body.

Although useful for measuring the temperature of a site on any body, the methods of the present invention may be particularly useful for measuring the temperature of a site when the site is not a black body emitter, the site is located in a highly reflected environment, there is a significant intensity of ambient radiation impinging on the site, or any combination of these factors. Since the method of the preset invention eliminates, or greatly reduces, error caused by a highly reflected environment and deviations from the black body emitter assumption, the method is ideal for measuring sites on bodies including, but not limited to, components of turbine engines, furnaces, boilers, and similar bodies.

BRIEF DESCRIPTION OF THE DRAWINGS

A further understanding of the invention can be gained from the following detailed description when read in conjunction with the accompanying drawings in which:

FIG. 2($a$) shows a side view of a site on the surface of a body showing one set of conditions that may be present during a radiation detection of the present invention.

FIG. 2($b$) shows a side view of a site on the surface of a body showing another set of conditions that may be present during a radiation detection of the present invention.

DETAILED DESCRIPTION OF INVENTION

The present invention relates to methods of measuring the differential emissivity and temperature of a site on a body while eliminating or minimizing errors introduced by the assumptions used by methods disclosed in the prior art. The present invention is also useful for monitoring the condition of a surface. One common assumption made in the prior art is the assumption that the site being measured is a perfect black body emitter. Since a perfect black body emitter absorbs all impinging radiation, the black body assumption assumes that the body reflects no radiation and that any detected radiation was emitted from the body. Another common prior art assumption is that the reflected radiation is insignificant when compared to the emitted radiation. As discussed throughout the detailed description, the methods of the present invention can provide readings that are superior to the prior art since the methods of the present invention do not rely on either of these assumptions.

While specific embodiments of the invention are described in detail below, it will be appreciated by those skilled in the art that various modifications and alternatives to these embodiments can be employed without deviating from the overall teachings of this description. Although several examples deal with turbine blades, the methods of the current invention are useful for measuring the temperature or differential emissivity of nearly any item or body. Accordingly, the particular embodiments disclosed are meant to be illustrative only and not limiting as to the scope of the invention, which is to be given the full breadth of the appended claims and any and all equivalents thereof.

As used herein, the radiation "arising" from a site includes all radiation that would be detected by a detection device aimed at the site. Radiation arising from a site includes, but is not limited to, radiation that is emitted from the site and radiation that is reflected by the site.

As used herein, the terms "external radiation" and "external infrared radiation" mean infrared radiation produced by a source, wherein the radiation has a known intensity at a given wavelength and the application of the radiation is controlled. External radiation may originate from any source capable of generating infrared radiation with a known intensity at a given wavelength. Sources that may be used to supply such required infrared radiation include, but are not limited to, lasers, light emitting diodes (LEDs), incandescent sources, and any other natural or manmade infrared radiation source.

As used herein, the term "ambient radiation" includes all sources of radiation except external radiation and the radiation emitted by the site being measured.

As used herein, the phrase "differential emissivity" means the difference between the emissivity values of two sites on a body.

A site on the surface of a body will emit radiation at an intensity proportional to the temperature of the site. Although the greatest intensity of emitted radiation is in the infrared portion of the spectrum, the distribution of wavelengths emitted and the intensity at each wavelength are dependent on factors including, but not limited to, the temperature of site. In addition, a site on the surface of a body can be subject to radiation from a multitude of external sources. This impinging radiation may be both absorbed by the site and reflected by the site. The impinging radiation that is absorbed will contribute to the temperature of the site, while reflected radiation will not contribute to the temperature. The emissivity ($\epsilon$) of a site is equal to the amount of radiation actually absorbed by the site divided by the amount of radiation that would be absorbed if all of the impinging radiation was absorbed. Emissivity is a function of one or more dynamic factors, such as, the temperature of the site, the wavelength of the impinging radiation, the age of the surface, and the condition of the surface.

Figure 1:
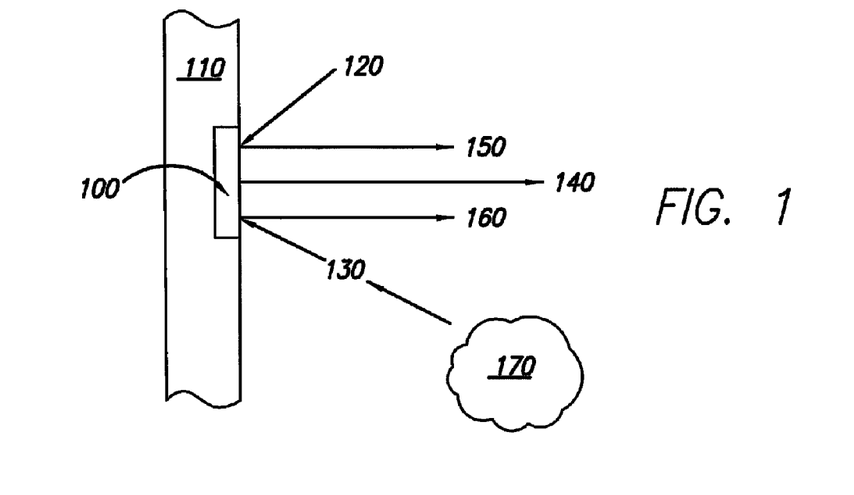
FIG. 1 shows a side view of a site on the surface of a body showing how radiation is impinging on the site, reflected by the site, and emitted from the site.

FIG. 1 depicts a typical site 100 on the surface of a body 110 and the radiation that may be impinging on the site 120, 130, emitted from the site due to its temperature 140, and reflected by the site 150, 160. The radiation impinging on the site may include ambient radiation 120 generated by the surrounding surfaces, and external radiation 130 from some external source 170. The radiation detected arising from the site may generally include three components. One component may be the radiation emitted from the site 140. Other components may be the reflected ambient radiation 150 and the reflected external radiation 160. As will be appreciated by those skilled in the art, this is a general description of the environment surrounding a typical site 100, and there may be more types of radiation present in some instances and fewer types of radiation present in others. Similarly, this description is but one way to categorize the radiation surrounding a typical site 100.

Figure 2A:
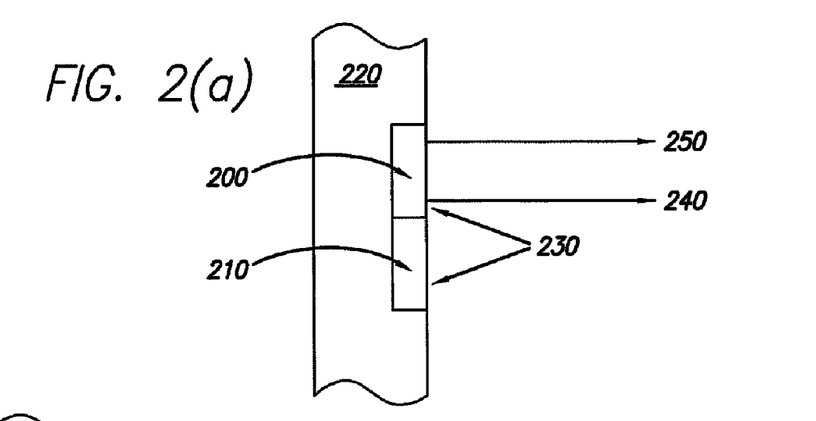
Figure 2B:
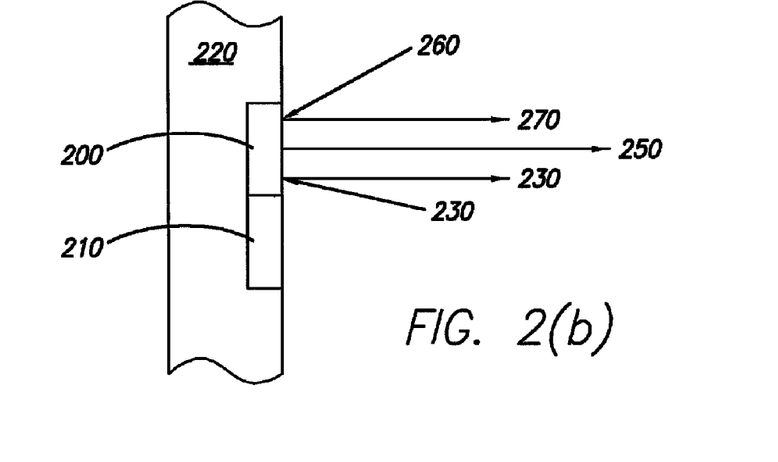

Referring to FIG. 2(a), one embodiment of the present invention may be useful for determining the differential emissivity between a first site 200 and a second site 210 on a body 220. There may be an intensity of ambient radiation (R) 230 impinging on both the first site 200 and the second site 210. One step of this method is to detect the intensity of the radiation at a first wavelength ($\lambda_1$) that arises from the first site 200, which includes the reflected ambient radiation 240 and the emitted radiation 250. Referring now to FIG. 2(b), another step is to irradiate the first site 200 using a known intensity ($E_o$) of external infrared radiation 260 at the first wavelength ($\lambda_1$) and detect the amount of radiation arising at the first wavelength from the first site 200, which includes the emitted radiation 250, the reflected ambient radiation 240, and the reflected external radiation 270. The same two measurements, with and without a known intensity ($E_o$) of external infrared radiation at the first wavelength ($\lambda_1$), are then taken for the second site 210. The final step is to use the radiation intensity detected for each of the four measurements described above to calculate the differential emissivity between the first site 200 and the second site 210.

The four measurements of total intensity detected as described in the embodiment above may be used to determine the differential emissivity between two sites 200, 210 in a number of ways, not limited to those described herein. In one general method of determining differential emissivity, each of the intensity measurements may be mathematically equated to one or more categories of radiation that contribute to the total intensity values detected. While certainly not the only way to categorize the radiation contributions, one method may include categories such as emitted radiation 250, reflected ambient radiation 240, and reflected external radiation 270. These equations may then be combined to solve for differential emissivity in terms of known values including, but not limited to, the intensity measurements, known constants, and other values that are measured either directly or indirectly. In some embodiments, determining the differential emissivity may require that certain values are estimated, while other embodiments may not require any estimates. The present invention envisions and includes all of these embodiments.

Another embodiment of the present invention may be useful for determining the temperature of a first site 200 and a second site 210 on a body 220. One step may be to detect the intensity of the radiation at a first wavelength ($\lambda_1$) that arises from the first site 200, which includes the emitted radiation 250 and the reflected ambient radiation 240. Referring now to FIG. 2(b), another step may be to irradiate the first site 200 using a known intensity ($E_o$) of external infrared radiation 260 at the first wavelength ($\lambda_1$) and detect the amount of radiation arising from the first site 200, which includes the emitted radiation 250, the reflected ambient radiation 240, and the reflected external radiation 270. The same two measurements, with and without a known intensity ($E_o$) of external infrared radiation at the first wavelength ($\lambda_1$) may then be taken for the second site 210. The amount of radiation arising from each of the first and second sites at a second wavelength ($\lambda_2$) may then be detected without external irradiation. This results in a total of six radiation intensity measurements. The final step is to use the radiation intensity detected for each of the six measurements described above to calculate the temperature of the first site 200 and the second site 210.

The six measurements of total intensity detected as described in the embodiment above may be used to determine the temperature of the two sites 200, 210 in a number of ways, not limited to those described herein. In one general method of determining temperature, each of the intensity measurements may be mathematically equated to one or more categories of radiation that contribute to the total intensity values detected. While certainly not the only way to categorize the radiation contributions, one method may include categories such as emitted radiation 250, reflected ambient radiation 240, and reflected external radiation 270. The equations may then be combined to solve for temperature in terms of known values including, but not limited to, the intensity measurements, known constants, and other values that are measured either directly or indirectly. In some embodiments, determining the temperature may require that certain values are estimated, while other embodiments may not require any estimates. The present invention envisions and includes all of these embodiments.

Another embodiment of the present invention is useful for determining the temperature of a first site 200 and a second site 210 on a body 220. One step is to detect the intensity of the radiation at a first wavelength ($\lambda_1$) that arises from the first site 200, which includes the emitted radiation 250 and the reflected ambient radiation 240. Referring now to FIG. 2(*b*), another step is to irradiate the first site 200 using a known intensity ($E_o$) of external infrared radiation 260 at the first wavelength ($\lambda_1$) and detect the amount of radiation arising from the first site 200, which includes the emitted radiation 250, the reflected ambient radiation 240, and the reflected external radiation 270. The same two measurements, with and without a known intensity ($E_o$) of external infrared radiation at the first wavelength ($\lambda_1$), are then taken for the second site 210. The same measurements are then taken at a second wavelength ($\lambda_2$) using the same intensity ($E_o$) for the two irradiation measurements. The final step is to use the radiation intensity detected for each of the eight measurements described above to calculate the temperature of the first site 200 and the second site 210.

The eight measurements of total intensity detected as described above may be used to determine the temperature of the two sites 200, 210 in a number of ways, not limited to those described herein. In one general method of determining temperature, each of the intensity measurements may be mathematically equated to one or more categories of radiation that contribute to the total intensity values detected. While certainly not the only way to categorize the radiation contributions, one method may include categories such as emitted radiation 250, reflected ambient radiation 240, and reflected external radiation 270. The equations may then be combined to solve for temperature in terms of known values including, but not limited to, the intensity measurements, known constants, and other values that are measured either directly or indirectly. In some embodiments, determining the temperature may require that certain values are estimated, while other embodiments may not require any estimates. The present invention envisions and includes all of these embodiments.

In another embodiment of the present invention, the first site 200 and the second site 210 are located in a highly reflected environment. As used herein, the phrase "highly reflected environment" refers to an environment where errors may be caused by the assumptions (e.g. the black body emitter assumption, the insignificant ambient radiation assumption, the estimated emissivity assumption) used for many common, radiation-based measurements of temperature or differential emissivity. More specifically, a "highly reflected environment" exists when one of the common assumptions or a combination of the assumptions would result in an error in the temperature reading of at least 5° F. An even more "highly reflected environment" exists when the resulting error is at least 15° F.

In another embodiment of the present invention, the body 220 that the sites 200, 210 are located on is a turbine component. In yet another embodiment, the turbine component is a stationary turbine vane. As will be appreciated by one skilled in the art, this measurement technique can be employed equally well using moving turbine blades as the turbine components. For instance, Patent Application Publication No. 2004/0179575 discloses an example of a radiation detection system that tracks the radiation arising from specific blades as they pass a stationary detection device. Registration techniques, similar to those employed in the '575 Patent Application Publication, may be used to detect radiation arising from a moving site, like a turbine blade.

In another embodiment of the present invention, the infrared detection is achieved using devices that detect a narrow-band of infrared radiation. Those skilled in the art will appreciate that current detection devices detect radiation having more than a single wavelength. The range of wavelengths detected may be referred to as the "bandwidth." The bandwidth detected is generally controlled by a filter, or set of filters, used to prevent the detection of unwanted wavelengths. As used herein, the phrase "narrow-band infrared radiation" refers to infrared radiation having a relatively narrow bandwidth in a given wavelength region. Preferably the bandwidth is narrow enough that the emissivity of each site 200, 210 is relatively constant over the bandwidth that is detected. More preferably, the emissivity varies by less than ten percent (10%) over the bandwidth actually detected, even more preferably, the emissivity varies by less than five percent (5%) over the bandwidth actually detected, and most preferably, the emissivity varies by less than two percent (2%) over the bandwidth actually detected. While current detection techniques typically rely on filters, any method of detecting "narrow-band infrared radiation" would be useful in the present method.

It is noteworthy that, while the irradiating radiation may or may not include more than one wavelength depending on the source of the radiation, the detection devices may generally detect a band of wavelengths. Thus, when discussing the detected intensity at a given wavelength, the specified wavelength may be near the center of the bandwidth actually detected.

In another embodiment of the invention the detection device is oriented so that the acceptance angle is approximately 0°. However, as will be appreciated by those skilled in the art, the acceptance angle may generally be up to about 60° before significant error is introduced into detection readings. As will also be appreciated by those skilled in the art, a correction based on the geometry of the site may enable accurate measurements for acceptance angles greater than about 60°. Thus, while the acceptance angle typically used in the inventive method may be approximately 0°, a much broader range of acceptance angles may be useful. As used herein, the "emittance angle" is the angle defined by the incident radiance received by the detector and the surface of the site on which the detector is focused. As used herein, the "acceptance angle" is the angle defined by a site's normal vector and the emittance angle, i.e. 90° minus the emittance angle.

It is noteworthy, that significant errors may occur if the spot size is larger than the site area. Thus, even when the acceptance angle is less than 60°, the angle can cause errors based on spot size. Spot size errors may be avoided using several approaches. One way to avoid spot size errors may be to insure that the spot fits within the site area at the emittance angle of the detection. As used herein, the "spot size" is the area on a body from which the detection device is detecting radiation. As will be appreciated by those skilled in the art, the spot size varies with the acceptance angle. As used herein, the "site area" is the area of the body selected as the site. As will be appreciated by those skilled in the art, site area is fixed once the site perimeter is selected.

In another embodiment of the present invention, the external infrared radiation irradiated at each site is steady-state infrared radiation. As used herein, the phrase "steady-state infrared radiation" indicates that the infrared radiation is not modulated or pulsed.

In another preferred embodiment of the present invention, the first site 200 and second site 210 are located in substantial proximity to one another. As used herein, the phrase "substantial proximity" indicates that each of the sites may be exposed to approximately the same intensity of ambient radiation 230. Preferably, the difference in ambient radiation intensities between the sites is less than twenty percent (20%), more preferably, the difference is less than ten percent (20%), and most preferably, the difference is less than five percent (5%).

In an embodiment of the present invention where two wavelengths of external radiation are used, the intensity of the external radiation at the first wavelength ($\lambda_1$) is approximately the same as the intensity of the external radiation at the second wavelength ($\lambda_2$). In a specific embodiment, the difference between the intensity at the first wavelength and the second wavelength is less than 5% and, in a more preferred embodiment, the difference in intensities is less than 1%.

In another embodiment of the present invention, the temperature determined for one or more locations on a body using a method of the current invention may be used to calibrate an infrared imaging device focused on the body. It is known in the art to use an infrared imaging device to determine the amount of infrared radiation emitted by locations in a turbine or other body. By looking for relatively hotter areas of the turbine, people conducting turbine inspections can locate areas of deterioration or spalling of the TBC. Since these approaches are subject to the same limitations as other temperature measuring devices, there are errors in the temperatures obtained from such measurements. The current methods allow those conducting turbine inspections to use infrared imaging devices and obtain more accurate temperature measurement for the entire turbine. Since the present methods are more accurately calibrated for each image, the present invention enables accurate comparisons of the same turbine over time. As will be appreciated by those skilled in the art, this same approach is useful for imaging other objects, whether they are in highly reflected environments or not.

In another embodiment of the present invention, the temperature may be determined for more than one location on the body, or bodies, being imaged using an infrared imaging device. For instance, the present invention may be used to determine temperature for multiple locations located throughout the infrared imaging device's field-of-view by selecting a first site and a second site at each location. Using these temperature values, the infrared imaging device may be calibrated or mapped to correct for reflection at the locations. As will be apparent to one skilled in the art, the values of reflection between these locations may be estimated using interpolation or extrapolation. Since reflection may be defined mainly by geometry and internal turbine temperature, which is relatively constant with time, after the initial temperature measurements, further measurements of individual locations are not generally required to maintain calibration over time.

Example #1

One method of determining the differential emissivity between the first site and the second site is disclosed below. Each of the detection steps described in the specification will yield a total intensity of radiation at a first specified wavelength, $i_{xy}(\lambda_1)$. The equation for the total intensity detected will have the following general form:

$i_{xy}(\lambda_1)$=[ambient radiation having wavelength $\lambda_1$ that is reflected by site $x$]+[external radiation having wavelength $\lambda_1$ that is reflected by site $x$]+[radiation emitted by site $x$ having wavelength $\lambda_1$]

The radiation detected from site X arising at a first wavelength, $\lambda_1$, with and without radiation irradiated at $\lambda_1$ are represented below:

$i_{xE}(\lambda_1) = r_x + e_x + i_x(\epsilon_x, \lambda_1, T)$ (with reflected external radiation)

$i_{x0}(\lambda_1) = r_x + 0 + i_x(\epsilon_x, \lambda_1, T)$ (with no reflected external radiation)

where:
$r_x$=ambient radiation having wavelength $\lambda_1$ that is reflected by site X;
$e_x$=external radiation irradiated having wavelength $\lambda_1$ that is reflected by site X;
$i_x(\epsilon_x, \lambda_1, T)$=radiation emitted by site X having wavelength $\lambda_1$;
$i_{xE}(\lambda_1)$=total radiation arising from site X when external radiation (E) at wavelength $\lambda_1$ is applied; and
$i_{x0}(\lambda_1)$=total radiation arising from site X when there is no external radiation (0).

As used in this labeling paradigm, the wavelength of $r_x$ and $e_x$ is the same as the wavelength specified by $i_{xE}(\lambda_1)$, wavelength $\lambda_1$ in this case.

As described in portions of the specification above, one method of determining the differential emissivity between site one and site two includes the steps of detecting the radiation at wavelength $\lambda_1$ arising from each of site one and site two at ambient conditions. Another step includes detecting the radiation arising from each of site one and site two while they are irradiated with external infrared radiation at wavelength, $\lambda_1$. Using the labeling paradigm described immediately above, the detected radiation arising from sites one and two can be represented as follows:

$$i_{1E}(\lambda_1) = r_1 + e_1 + i_1(\epsilon_1, \lambda_1, T) \quad (1)$$

$$i_{10}(\lambda_1) = r_1 + 0 + i_1(\epsilon_1, \lambda_1, T) \quad (2)$$

$$i_{2E}(\lambda_1) = r_2 + e_2 + i_2(\epsilon_2, \lambda_1, T) \quad (3)$$

$$i_{20}(\lambda_1) = r_2 + 0 + i_2(\epsilon_2, \lambda_1, T) \quad (4)$$

One skilled in the art will recognize that $r_x = R(1-\epsilon_x)$ and $e_x = E_o(1-\epsilon_x)$, where R represents the intensity of the ambient radiation, $E_o$ represents the intensity of the external radiation, and $(1-\epsilon_x)$ represents the fraction of impinging radiation that is reflected from site X. This follows, since $\epsilon_x$ equals the absorbed radiation. Planck's law of black body radiation is:

$$i_x(\lambda_i, T) = \frac{8\pi hc}{\lambda_i^5} \times \frac{1}{\exp(hc/kT\lambda_i) - 1} = \frac{C_1(\lambda_i^5)}{\exp\left(\frac{C_2(\lambda_i)}{T}\right) - 1} \quad (5)$$

where, x is the site being measured.

Since, the present method does not use the black body assumption, emissivity is incorporated into Planck's law of black body radiation as shown in equation (6) below:

$$i_x(\epsilon_x, \lambda_i, T) = \frac{\epsilon_x C_1(\lambda_i^5)}{\exp\left(\frac{C_2(\lambda_i)}{T}\right) - 1}. \quad (6)$$

Substituting these equations for $r_x$, $e_x$, and $i_x(\epsilon_2, \lambda_1, T)$, into equations (1)-(4) and simplifying yields:

$$i_{1E}(\lambda_1) = (R + E_0)(1 - \epsilon_1) + \frac{\epsilon_1 C_1(\lambda_1^5)}{\exp\left(\frac{C_2(\lambda_1)}{T}\right) - 1} \quad (7)$$

$$i_{10}(\lambda_1) = R(1-\varepsilon_1) + \frac{\varepsilon_1 C_1(\lambda_1^5)}{\exp\left(\frac{C_2(\lambda_1)}{T}\right) - 1} \quad (8)$$

$$i_{2E}(\lambda_1) = (R+E_0)(1-\varepsilon_2) + \frac{\varepsilon_2 C_1(\lambda_1^5)}{\exp\left(\frac{C_2(\lambda_1)}{T}\right) - 1} \quad (9)$$

$$i_{20}(\lambda_1) = R(1-\varepsilon_2) + \frac{\varepsilon_2 C_1(\lambda_1^5)}{\exp\left(\frac{C_2(\lambda_1)}{T}\right) - 1}. \quad (10)$$

Sites one and two may be selected such that the intensity of the ambient radiation, R, impinging on sites one and two is essentially equal. In such a case, subtracting equation (7) from equation (9) yields:

$$\Delta i_E(\lambda_1) = \left(\frac{C_1(\lambda_1^5)}{\exp\left(\frac{C_2(\lambda_1)}{T}\right) - 1} - (R+E_o)\right) \Delta\varepsilon \quad (11)$$

When the intensity of the ambient radiation, R, impinging on sites one and two is essentially equal, subtracting equation (8) from equation (10) yields:

$$\Delta i'_0(\lambda_1) = \left(\frac{C_1(\lambda_1^5)}{\exp\left(\frac{C_2(\lambda_1)}{T}\right) - 1} - R\right) \Delta\varepsilon \quad (12)$$

Solving equation (11) for $R\Delta\varepsilon$ yields equation (13):

$$R\Delta\varepsilon = \left(\frac{C_1(\lambda_1^5)}{\exp\left(\frac{C_2(\lambda_1)}{T}\right) - 1}\right) \Delta\varepsilon - \Delta i_E(\lambda_1) - E_o\Delta\varepsilon \quad (13)$$

Solving equation (12) for $R\Delta\varepsilon$ yields equation (14):

$$R\Delta\varepsilon = \left(\frac{C_1(\lambda_1^5)}{\exp\left(\frac{C_2(\lambda_1)}{T}\right) - 1}\right) \Delta\varepsilon - \Delta i'_0(\lambda_1) \quad (14)$$

Subtracting equation (14) from equation (13) yields equation (15), which is independent of ambient radiation, R.

$$0 = \Delta i_0'(\lambda_1) - \Delta i_E(\lambda_1) - E_o\Delta\varepsilon \quad (15)$$

Solving equation (15) for $\Delta\varepsilon$ yields:

$$\Delta\varepsilon = \frac{\Delta i'_0(\lambda_1) - \Delta i_E(\lambda_1)}{E_o} \quad (16)$$

Equation (16) can be solved directly using the four measurements of total radiation arising from the sites detected according to an embodiment for measuring differential emissivity. As discussed previously, this embodiment has advantages over other methods of determining differential emissivity because the error associated with the unknown amount of ambient radiation is substantially reduced or eliminated.

Example #2

One method of determining the temperature of the first site and the second site is disclosed below. Taking each of the detection steps described in an embodiment for measuring temperature described above will yield a total intensity of radiation at a specified wavelength, $i_{xy}(\lambda_1)$. In one method a total of six intensity measurements are taken using infrared radiation detection devices. For each site, the total intensity of radiation at a first wavelength will be detected with and without an external source of radiation, $R(\lambda_1)$. For each site, the total intensity of radiation at a second wavelength, $\lambda_2$, will be detected without an external source of radiation. Using the labeling paradigm described in Example #1, the detected radiation arising from sites one and two can be represented as follows:

$$i_{1E}(\lambda_1) = r_1 + e_1 + i_1(\varepsilon_1, \lambda_1, T) \quad (17)$$

$$i_{10}(\lambda_1) = r_1 + 0 + i_1(\varepsilon_1, \lambda_1, T) \quad (18)$$

$$i_{E2}(\lambda_1) = r_2 + e_2 + i_2(\varepsilon_2, \lambda_1, T) \quad (19)$$

$$i_{20}(\lambda_1) = r_2 + 0 + i_2(\varepsilon_2, \lambda_1, T) \quad (20)$$

$$i_{10}(\lambda_2) = r_1 + 0 + i_1(\varepsilon_1, \lambda_2, T) \quad (21)$$

$$i_{20}(\lambda_2) = r_2 + 0 + i_2(\varepsilon_2, \lambda_2, T) \quad (22)$$

As in Example #1, one skilled in the art will recognize that $r_x = R(1-\varepsilon_x)$ and $e_x = E_o(1-\varepsilon_x)$, where R represents the intensity of the ambient radiation, $E_o$ represents the intensity of the external radiation, and $(1-\varepsilon_x)$ represents the fraction of impinging radiation that is reflected. Furthermore, as discussed above, Planck's law of black body radiation modified for a non-black body is shown in equation (6). Substituting these values into equations (17)-(22) yields the following set of equations:

$$i_{1E}(\lambda_1) = (R+E_0)(1-\varepsilon_1) + \frac{\varepsilon_1 C_1(\lambda_1^5)}{\exp\left(\frac{C_2(\lambda_1)}{T}\right) - 1} \quad (23)$$

$$i_{10}(\lambda_1) = R(1-\varepsilon_1) + \frac{\varepsilon_1 C_1(\lambda_1^5)}{\exp\left(\frac{C_2(\lambda_1)}{T}\right) - 1} \quad (24)$$

$$i_{2E}(\lambda_1) = (R+E_0)(1-\varepsilon_2) + \frac{\varepsilon_2 C_1(\lambda_1^5)}{\exp\left(\frac{C_2(\lambda_1)}{T}\right) - 1} \quad (25)$$

$$i_{20}(\lambda_1) = R(1-\varepsilon_2) + \frac{\varepsilon_2 C_1(\lambda_1^5)}{\exp\left(\frac{C_2(\lambda_1)}{T}\right) - 1} \quad (26)$$

$$i_{10}(\lambda_2) = R(1-\varepsilon_1) + \frac{\varepsilon_1 C_1(\lambda_2^5)}{\exp\left(\frac{C_2(\lambda_2)}{T}\right) - 1} \quad (27)$$

$$i_{20}(\lambda_2) = R(1-\varepsilon_2) + \frac{\varepsilon_2 C_1(\lambda_2^5)}{\exp\left(\frac{C_2(\lambda_2)}{T}\right) - 1} \quad (28)$$

As shown above in Example #1, equations (23) through (26) can be combined to yield equation (16):

$$\Delta \varepsilon = \frac{\Delta i'_0(\lambda_1) - \Delta i_E(\lambda_1)}{E_o}.$$

Sites one and two may be selected so that the intensity of the ambient radiation, R, is approximately the same for both sites. In such a situation, subtracting equation (24) from equation (26) yields:

$$\Delta i'_0(\lambda_1) = \left( \frac{C_1(\lambda_1^5)}{\exp\left(\frac{C_2(\lambda_1)}{T}\right) - 1} - R \right) \Delta \varepsilon \quad (29)$$

If the intensity of the ambient radiation, R, impinging on both sites is approximately the same, subtracting equation (27) from equation (28) yields:

$$\Delta i'_0(\lambda_2) = \left( \frac{C_1(\lambda_2^5)}{\exp\left(\frac{C_2(\lambda_2)}{T}\right) - 1} - R \right) \Delta \varepsilon \quad (30)$$

The two wavelengths of external radiation ($\lambda_1$, $\lambda_2$) may be selected so that the differential emissivity, $\Delta \epsilon$, is approximately the same for both sites. In such a situation, subtracting equation (29) from equation (30) yields:

$$\Delta i'_0(\lambda_2) - \Delta i'_0(\lambda_1) = \left( \frac{C_1(\lambda_2^5)}{\exp\left(\frac{C_2(\lambda_2)}{T}\right) - 1} - \frac{C_1(\lambda_1^5)}{\exp\left(\frac{C_2(\lambda_1)}{T}\right) - 1} \right) \Delta \varepsilon \quad (31)$$

Substituting equation (16) for $\Delta \epsilon$ in equation (31), and moving all $\Delta i$ values to the left side of the equation yields:

$$\frac{E_o[\Delta i'_0(\lambda_2) - \Delta i'_0(\lambda_1)]}{\Delta i'_0(\lambda_1) - \Delta i_E(\lambda_1)} = \left( \frac{C_1(\lambda_2^5)}{\exp\left(\frac{C_2(\lambda_2)}{T}\right) - 1} - \frac{C_1(\lambda_1^5)}{\exp\left(\frac{C_2(\lambda_1)}{T}\right) - 1} \right) \quad (32)$$

Sites one and two may be selected such that the temperatures of the first site and the second site are essentially the same. In such a situation, the only unknown in equation (32) is temperature, T. This presumption is reinforced when the first site and the second site are in close proximity to one another. In either case, as should be apparent to one skilled in the art, temperature can be determined using equation (32) by applying any number of well known computational methods that adjust the value of T until the right side of equation (32) is equal to the left side of equation (32).

Example #3

Another method of determining the temperature of the first site and the second site is a slight modification of Example #2. As in Example #2, the method includes a total of six intensity measurements. For each site, the total intensity of radiation at a first wavelength may be detected with and without an external source of radiation, $R(\lambda_1)$. For each site, the total intensity of radiation at a second wavelength, $\lambda_2$, will be detected with an external source of radiation, $R(\lambda_2)$. Using the labeling paradigm described in Example #1, the intensity of detected radiation arising from sites one and two can be represented as follows:

$$i_{1E}(\lambda_1) = r_1 + e_1 + i_1(\epsilon_1, \lambda_1, T) \quad (33)$$

$$i_{10}(\lambda_1) = r_1 + 0 + i_1(\epsilon_1, \lambda_1, T) \quad (34)$$

$$i_{2E}(\lambda_1) = r_2 + e_2 + i_2(\epsilon_2, \lambda_1, T) \quad (35)$$

$$i_{20}(\lambda_1) = r_2 + 0 + i_2(\epsilon_2, \lambda_1, T) \quad (36)$$

$$i_{1E}(\lambda_2) = r_1 + e_1 + i_1(\epsilon_1, \lambda_2, T) \quad (37)$$

$$i_{2E}(\lambda_2) = r_2 + e_2 + i_2(\epsilon_2, \lambda_2, T) \quad (38)$$

As shown in Example #1, equations (33) through (36) can be combined to yield equation (16):

$$\Delta \varepsilon = \frac{\Delta i'_0(\lambda_1) - \Delta i_E(\lambda_1)}{E_o}$$

Sites one and two may be selected such that the total intensity of the impinging radiation, $R+E_o$, is approximately the same for both sites. In such a situation, subtracting equation (33) from equation (35) yields:

$$\Delta i_E(\lambda_1) = \left( \frac{C_1(\lambda_1^5)}{\exp\left(\frac{C_2(\lambda_1)}{T}\right) - 1} - (R + E_o) \right) \Delta \varepsilon \quad (39)$$

If sites one and two are selected such that the total intensity of the impinging radiation, $R+E_o$, is approximately the same for both sites, subtracting equation (37) from equation (38) yields:

$$\Delta i_E(\lambda_2) = \left( \frac{C_1(\lambda_2^5)}{\exp\left(\frac{C_2(\lambda_2)}{T}\right) - 1} - (R + E_o) \right) \Delta \varepsilon \quad (40)$$

The two wavelengths of external radiation ($\lambda_1$, $\lambda_2$), may be selected so that the differential emissivity, $\Delta \epsilon$, may be approximately the same for both wavelengths. In such a situation, subtracting equation (39) from equation (40) yields:

$$\Delta i_E(\lambda_2) - \Delta i_E(\lambda_1) = \left( \frac{C_1(\lambda_2^5)}{\exp\left(\frac{C_2(\lambda_2)}{T}\right) - 1} - \frac{C_1(\lambda_1^5)}{\exp\left(\frac{C_2(\lambda_1)}{T}\right) - 1} \right) \Delta \varepsilon \quad (41)$$

Substituting equation (16) for $\Delta \epsilon$ in equation (41) and moving all $\Delta i$ values to the left side of the equation yields:

$$\frac{E_o[\Delta i_E(\lambda_2) - \Delta i_E(\lambda_1)]}{\Delta i'_0(\lambda_1) - \Delta i_E(\lambda_1)} = \left( \frac{C_1(\lambda_2^5)}{\exp\left(\frac{C_2(\lambda_2)}{T}\right) - 1} - \frac{C_1(\lambda_1^5)}{\exp\left(\frac{C_2(\lambda_1)}{T}\right) - 1} \right) \quad (42)$$

Sites one and two may be selected such that the temperatures of the first site and the second site are essentially the same. In such a situation, the only unknown in equation (42) is temperature, T. This presumption is reinforced when the first site and the second site are in close proximity to one another. In either case, as should be apparent to one skilled in the art, temperature can be determined using equation (42) by applying any number of well known computational methods that adjust the value of T until the right side of equation (42) is equal to the left side of equation (42).

Example #4

Yet another method of determining the temperature of the first site and the second site is described below. This method includes a total of eight intensity measurements. For each site, the total intensity of radiation at a first wavelength, $\lambda_1$, may be detected with and without an external source of radiation, having intensity $R(\lambda_1)$. Similarly, for each site, the total intensity of radiation at a second wavelength, $\lambda_2$, may be detected with and without an external source of radiation, having an intensity $R(\lambda_2)$. Using the labeling paradigm described in Example #1, the detected radiation arising from sites one and two can be represented as follows:

$$i_{1E}(\lambda_1) = r_1 + e_1 + i_1(\epsilon_1, \lambda_1, T) \tag{43}$$

$$i_{10}(\lambda_1) = r_1 + 0 + i_1(\epsilon_1, \lambda_1, T) \tag{44}$$

$$i_{2E}(\lambda_1) = r_2 + e_2 + i_2(\epsilon_2, \lambda_1, T) \tag{45}$$

$$i_{20}(\lambda_1) = r_2 + 0 + i_2(\epsilon_2, \lambda_1, T) \tag{46}$$

$$i_{1E}(\lambda_2) = r_1 + e_1 + i_1(\epsilon_1, \lambda_2, T) \tag{47}$$

$$i_{10}(\lambda_2) = r_1 + 0 + i_1(\epsilon_1, \lambda_2, T) \tag{48}$$

$$i_{2E}(\lambda_2) = r_2 + e_2 + i_2(\epsilon_2, \lambda_2, T) \tag{49}$$

$$i_{20}(\lambda_2) = r_2 + 0 + i_2(\epsilon_2, \lambda_2, T) \tag{50}$$

Analogous to the way equation (16) was derived in Example #1, equations (43) through (46) can be combined to yield equation (51):

$$\Delta \varepsilon_{\lambda_1}(\lambda_1) = \frac{\Delta i_0'(\lambda_1) - \Delta i_E(\lambda_1)}{E_o} \tag{51}$$

Similarly, equations (47) through (50) can be combined to yield equation (52):

$$\Delta \varepsilon_{\lambda_2}(\lambda_2) = \frac{\Delta i_0'(\lambda_2) - \Delta i_E(\lambda_2)}{E_o} \tag{52}$$

Sites one and two may be selected such that the intensity of the ambient radiation, R, impinging on each site is approximately equal. In such a situation, subtracting equation (44) from equation (46) yields:

$$\Delta i_0'(\lambda_1) = \left( \frac{C_1(\lambda_1^5)}{\exp\left(\frac{C_2(\lambda_1)}{T}\right) - 1} - R \right) \Delta \varepsilon_{\lambda_1}(\lambda_1) \tag{53}$$

Sites one and two may be selected such that the intensity of the ambient radiation, R, impinging on the two sites is approximately equal. In such a situation, subtracting equation (48) from equation (50) yields:

$$\Delta i_0'(\lambda_2) = \left( \frac{C_1(\lambda_2^5)}{\exp\left(\frac{C_2(\lambda_2)}{T}\right) - 1} - R \right) \Delta \varepsilon_{\lambda_2}(\lambda_2) \tag{54}$$

Solving equation (53) for R yields:

$$R = \left( \frac{C_1(\lambda_1^5)}{\exp\left(\frac{C_2(\lambda_1)}{T}\right) - 1} \right) - \frac{\Delta i_0'(\lambda_1)}{\Delta \varepsilon_{\lambda_1}(\lambda_1)} \tag{55}$$

Solving equation (54) for R yields:

$$R = \left( \frac{C_1(\lambda_2^5)}{\exp\left(\frac{C_2(\lambda_2)}{T}\right) - 1} \right) - \frac{\Delta i_0'(\lambda_2)}{\Delta \varepsilon_{\lambda_2}(\lambda_2)} \tag{56}$$

The two wavelengths of external radiation ($\lambda_1, \lambda_2$), may be selected so that the intensity of the ambient radiation, R, is approximately the same for both wavelengths. In such a situation, subtracting equation (55) from equation (56) yields:

$$\frac{\Delta i_0'(\lambda_2)}{\Delta \varepsilon_{\lambda_2}(\lambda_2)} - \frac{\Delta i_0'(\lambda_1)}{\Delta \varepsilon_{\lambda_1}(\lambda_1)} = \left( \frac{C_1(\lambda_2^5)}{\exp\left(\frac{C_2(\lambda_2)}{T}\right) - 1} \right) - \left( \frac{C_1(\lambda_1^5)}{\exp\left(\frac{C_2(\lambda_1)}{T}\right) - 1} \right) \tag{57}$$

Sites one and two may be selected such that the temperatures of the first site and the second site are essentially the same. In such a situation, the only unknown in equation (57) is temperature, T. This presumption is reinforced when the first site and the second site are in close proximity to one another. In either case, as should be apparent to one skilled in the art, temperature can be determined using equation (57) by applying any number of well known computational methods that adjust the value of T until the right side of equation (57) is equal to the left side of equation (57).

While specific embodiments of the invention have been described in detail above, it will be appreciated by those skilled in the art that various modifications and alternatives to these embodiments can be employed without deviating from the overall teachings of this disclosure. Accordingly, the particular embodiments disclosed are meant to be illustrative only and not limiting as to the scope of the invention which is to be given the full breadth of the appended claims and any and all equivalents thereof.

I claim:

1. A method of measuring the in situ differential emissivity between two sites on a surface of an object, comprising:
   detecting infrared radiation arising at a first wavelength from a first site on a surface of a body when not irradiated by external infrared radiation;
   detecting infrared radiation arising at said first wavelength from said first site while said first site is irradiated by external infrared radiation at said first wavelength;
   detecting infrared radiation arising at said first wavelength from a second site on the surface of said body when not irradiated by external infrared radiation;
   detecting infrared radiation arising at said first wavelength from said second site while said second site is irradiated by external infrared radiation at said first wavelength; and determining an in situ differential emissivity value based on the detection of infrared radiation arising from said first site and said second site without irradiation by external infrared radiation and with irradiation by external infrared radiation.

2. The method of claim 1, wherein said first site and said second site are located in a highly reflected environment.

3. The method of claim 1, wherein said body is a turbine component.

4. The method of claim 3, wherein said turbine component is a turbine vane.

5. The method of claim 1, wherein said infrared radiation is detected using a device capable of narrow-band infrared radiation detection.

6. The method of claim 1, wherein said external infrared radiation is steady-state infrared radiation.

7. The method of claim 1, wherein said first site and said second site are in substantial proximity to one another.

* * * * *